United States Patent
Makam et al.

(10) Patent No.: US 8,539,514 B2
(45) Date of Patent: Sep. 17, 2013

(54) WORKFLOW INTEGRATION AND PORTAL SYSTEMS AND METHODS

(75) Inventors: Chethan Makam, Irving, TX (US); Swapneel H. Desai, Dallas, TX (US); Vittal Gunturu, Flower Mound, TX (US); Miguel Quiroga, New York, NY (US); Zouhair Sebati, Edgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 248 days.

(21) Appl. No.: 12/956,754

(22) Filed: Nov. 30, 2010

(65) Prior Publication Data

US 2012/0137309 A1    May 31, 2012

(51) Int. Cl.
 *G06F 3/00* (2006.01)
 *G06Q 10/00* (2012.01)

(52) U.S. Cl.
 USPC ........... 719/320; 719/313; 719/328; 705/7.27

(58) Field of Classification Search
 None
 See application file for complete search history.

(56) References Cited

U.S. PATENT DOCUMENTS

| | | | | |
|---|---|---|---|---|
| 2006/0277544 A1* | 12/2006 | Bjoernsen et al. | | 718/100 |
| 2007/0265895 A1* | 11/2007 | Moore | | 705/7 |
| 2009/0006167 A1* | 1/2009 | Toussaint et al. | | 705/8 |
| 2009/0083759 A1* | 3/2009 | Keil et al. | | 719/313 |
| 2009/0171718 A1* | 7/2009 | Barlow et al. | | 705/7.27 |
| 2009/0260021 A1* | 10/2009 | Haenel et al. | | 719/328 |
| 2009/0292800 A1* | 11/2009 | Ng et al. | | 709/223 |
| 2010/0205616 A1* | 8/2010 | Lai et al. | | 719/320 |

OTHER PUBLICATIONS

"Combination of RSS Newsfeeds and Forms for Driving Web-based Workflow", Bourges-Waldegg, 2005, pp. 1-8.*
"Designing of Portlet-based Web Portals", Goni, 2008, pp. 1-179.*
"Building the PolarGrid Portal Using Web 2.0 and OpenSocial", Guo, 2009, pp. 1-8.*

* cited by examiner

*Primary Examiner* — Tuan Dao

(57) ABSTRACT

An exemplary system includes a workflow integration subsystem communicatively coupled to a backend workflow subsystem maintaining a set of backend workflow tasks native to the backend workflow subsystem, the workflow integration subsystem configured to maintain a set of integrated workflow tasks representative of the set of backend workflow tasks. The system also includes a portal subsystem configured to communicate with the workflow integration subsystem and the backend workflow subsystem. The portal subsystem is further configured to provide a frontend portal for access by a user, receive a request provided by the user through the frontend portal, and provide access to workflow functionality through the frontend portal in response to the request, wherein the portal subsystem is configured to select whether the workflow functionality is subject to control by the backend workflow subsystem or the portal subsystem. Corresponding systems and methods are also disclosed.

23 Claims, 9 Drawing Sheets

WORKFLOW INTEGRATION AND PORTAL SYSTEMS AND METHODS

BACKGROUND INFORMATION

A typical enterprise computing environment may include multiple different computing applications supporting a variety of different enterprise organizations and business purposes. For example, many enterprises, such as businesses and the like, employ various computing applications to support customer billing, sales, accounting, marketing, inventory, ordering, repairs, service, procurement, etc.

Computing applications within an enterprise computing environment may employ workflow engines configured to facilitate the flow of information, processing, tasks, input, and output associated with the computing applications. In general, a workflow engine facilitates the flow of information, processing, tasks, input, and output by detecting events, interpreting the events, and acting on the events in accordance with defined rules and/or computing processes. For example, a workflow engine may detect an event and, in response to the event, generate a task based on defined rules and/or computing processes. The task may include a task that is to be performed by the application, one or more users associated with the application, and/or one or more other computing applications. To facilitate access to and/or performance of one or more actions on a task by a user, a workflow engine and/or a computing application employing the workflow engine typically provides a user interface for access and utilization by the user to receive notification of the task, access the task, and/or perform one or more actions related to the task.

In a conventional enterprise computing environment, the various computing applications that employ workflow engines are typically discrete and/or heterogeneous in nature. The computing applications may be heterogeneous for various reasons. For example, the computing applications may provide multiple different user interfaces by which users associated with the enterprise access and perform actions associated with workflow tasks. Consequently, a user, such as an employee who is responsible for performing actions related to tasks, may receive notifications related to tasks in diverse ways and/or may be required to access multiple different user interfaces in order to perform those actions. For example, an employee may be required to login to a first computing application to access a first user interface to review and approve a request for reimbursement of an expense incurred by another employee, and to login to a second, separate computing application to access a second, separate user interface to review and approve a travel or time-off request from another employee. This is inconvenient, inefficient, and potentially confusing and burdensome for the user. Moreover, where the user interfaces are non-uniform in appearance or functionality, an inconsistent and potentially confusing user experience is produced.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION OF PREFERRED EMBODIMENTS

Exemplary workflow integration and portal systems and methods are disclosed. In certain embodiments, the exemplary systems and methods described herein may be implemented or otherwise used to integrate backend workflow tasks native to one or more backend workflow subsystems into an integrated workflow that contains integrated workflow tasks representative of the backend workflow tasks. In certain examples, the integrated workflow tasks may be dynamically generated and maintained based on metadata dynamically provided by the one or more backend workflow subsystems such that the integrated workflow tasks may be an up-to-date representation of the backend workflow tasks. Backend workflow functionality of one or more backend subsystems may also be integrated for use in operating on the integrated workflow tasks. Various levels of integration may be supported. As described herein, for example, full-level integration, summary-level integration, and hybrid-level integration of backend workflow tasks and/or workflow functionality, or any combination or sub-combination thereof may be supported.

In addition, the exemplary systems and methods described herein may be implemented or otherwise used to provide a frontend workflow portal through which one or more users may access workflow tasks and/or workflow functionality that may be used to access and/or perform actions on workflow tasks. In certain embodiments, exemplary systems and methods described herein may be implemented or otherwise used to select whether workflow functionality to which access is provided through the portal is subject to control by a portal subsystem providing the portal or by one or more backend workflow subsystems. Such selective control over workflow functionality to which access is provided through the portal may support various levels of workflow integration, including any of the various levels of integration mentioned above.

The portal may provide a centralized access point through which a user may access workflow tasks and functionality associated with multiple backend workflow subsystems. Accordingly, a user may access workflow tasks and/or workflow functionality in order to access and/or perform actions on workflow tasks through the portal, including accessing and/or performing actions directly on integrated workflow tasks and/or backend workflow tasks native to one or more backend workflow subsystems. As described in more detail further below, user requests received through the portal to access and/or perform actions on workflow tasks may be used to selectively apply requested workflow functionality directly to either integrated workflow tasks maintained by a workflow integration subsystem or backend workflow tasks maintained by one or more backend workflow subsystems.

These and other advantages, features, and/or elements of the exemplary systems and methods disclosed herein will now be described in reference to the drawings.

Figure 1:
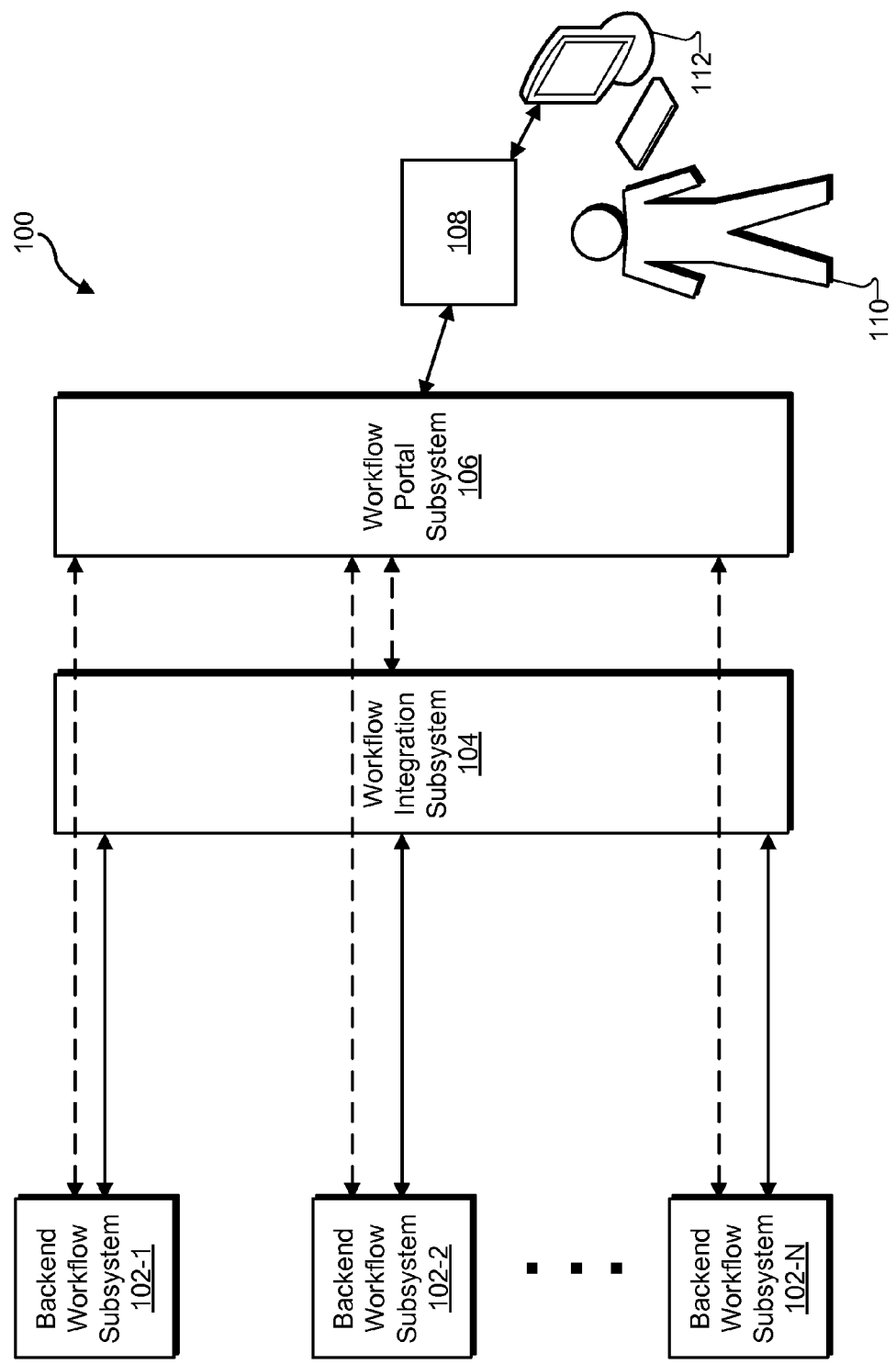
FIG. 1 illustrates an exemplary workflow integration and portal system according to principles described herein.

FIG. 1 illustrates an exemplary workflow integration and portal system 100 (or simply "system 100"). As shown in FIG. 1, system 100 may include multiple backend workflow subsystems 102 (e.g., backend workflow subsystems 102-1 through 102-N) communicatively coupled to a workflow integration subsystem 104 (or simply "integration subsystem 104"), which may be configured to interact with backend workflow subsystems 102 to generate and maintain an integrated workflow including one or more sets of integrated workflow tasks that are representative of one or more sets of backend workflow tasks native to backend workflow subsystems 102. Backend workflow subsystem 102 and integration subsystem 104 may be configured to communicate with one another, including exchanging messages (e.g., service calls containing workflow task, request, and/or operation metadata) indicating updates to backend workflow tasks that are to be propagated to the integrated workflow and/or messages indicating updates to the integrated workflow that are to be propagated to one or more backend workflow tasks. Accordingly, integrated workflow tasks maintained by integration subsystem 104 may be an up-to-date representation of backend workflow tasks maintained by backend workflow subsystems 102.

As shown in FIG. 1, system 100 may also include a workflow portal subsystem 106 (or simply "portal subsystem 106") configured to provide a frontend portal 108 through which one or more users may gain access to workflow tasks and/or workflow functionality in order to access and/or perform one or more actions on one or more workflow tasks, including one or more integrated workflow tasks maintained by integration subsystem 104 and/or backend workflow tasks maintained by one or more backend workflow subsystems 102. For example, a user 110 may utilize an access device 112 to access portal 108, through which user 110 may access workflow functionality to access and/or perform one or more actions on one or more workflow tasks. As represented by the dashed lines shown in FIG. 1, portal subsystem 106 may be configured to selectively interact with integration subsystem 104 and/or backend workflow subsystems 102 to provide portal access to workflow tasks and/or workflow functionality of integration subsystem 104 and/or backend workflow subsystems 102 subject to control by portal subsystem 106 or backend workflow subsystems 102, as described in more detail below.

Backend workflow subsystems 102 may provide backend workflow functionality for accessing and/or performing actions on respective backend workflow tasks maintained by backend workflow subsystems 102, and integration subsystem 104 and/or portal subsystem 106 may provide integrated workflow functionality for accessing and/or performing actions on integrated workflow tasks maintained by integration subsystem 104. Integrated workflow functionality may be configured to mirror corresponding backend workflow functionality. To this end, integrated workflow functionality may incorporate any business rules and/or logic associated with backend workflow functionality. As used herein, the term "workflow functionality" may refer to any operation that may be performed on or in relation to one or more workflow tasks, including, without limitation, generating, accessing, approving, rejecting, accessing additional details about, modifying, assigning, postponing, suspending, delegating, marking as complete, combining, merging, dividing, deleting, and/or otherwise updating one or more workflow tasks.

Workflow functionality provided by and/or performed by a backend workflow subsystem 102 may be said to be subject to control by the backend workflow subsystem 102. Similarly, workflow functionality provided by and/or performed by integration subsystem 104 and/or portal subsystem 106 may be said to be subject to control by portal subsystem 106.

Components of system 100 may communicate with one another using any suitable communication technologies, devices, media, protocols, and/or networks supportive of data communications, including, but not limited to, the Internet, intranets, local area networks, wide area networks, other communications networks, data transmission media, communications devices, network elements, Transmission Control Protocol ("TCP"), Internet Protocol ("IP"), File Transfer Protocol ("FTP"), Telnet, Hypertext Transfer Protocol ("HTTP"), Simple Object Access Protocol ("SOAP"), Extensible Markup Language ("XML") formatted messages, service calls (e.g., web service calls), remote portal technologies (e.g., Web Services for Remote Portlet ("WSRP") technologies, socket connections, Ethernet, data and/or service bus technologies, service-oriented architecture technologies, and other suitable communications technologies.

In certain implementations, backend workflow subsystems 102, integration subsystem 104, and portal subsystem 106 may be configured to communicate using web service calls and/or WSRP-related communications. The use of web service calls may allow integration subsystem 104 and/or portal subsystem 106 to communicate with backend workflow subsystems 102 (e.g., to access backend workflow functionality of backend workflow subsystems 102) regardless and/or independently of the computing platforms on which backend workflow subsystems 102 are implemented. The user of WSRP-related communications may allow portal subsystem 106 to leverage one or more backend user interface portlets to populate user interfaces presented in portal 108. For example, portal subsystem 106 may be configured to plug a backend user interface portlet produced by a backend workflow subsystem 102 into a user interface in portal 108 in accordance with WSRP technologies. By plugging such a portlet into a user interface in portal 108, a user may access and interact with backend workflow functionality of the backend workflow subsystem 102 through portal 108.

Components of system 100 may include and/or be implemented by one or more suitable physical computing devices configured to perform any of the operations described herein. For example, backend workflow subsystems 102, integration subsystem 104, and/or portal subsystem 106 may include and/or be implemented by any number of computing device such as one or more server devices.

While an exemplary system 100 is shown in FIG. 1, the exemplary components illustrated in FIG. 1 are not intended to be limiting. Other components and/or configurations of components may be used in other implementations. Exemplary components of system 100 will now be described in additional detail.

Backend workflow subsystems 102 may be configured to execute workflow operations, including, without limitation, maintaining predefined workflow rules (e.g., business rules and/or logic), detecting predefined events (e.g., requests for execution of one or more workflow functions) in accordance with the workflow rules, and performing one or more backend workflow functions in response to the predefined events and in accordance with the workflow rules. Backend workflow subsystems 102 may be configured to perform any other workflow-related operations as may suit a particular application, business purpose, or implementation. Workflow tasks generated, maintained, and/or otherwise acted on by backend workflow subsystems 102 may be referred to herein as "backend workflow tasks."

Backend workflow subsystems 102 may be separate and/or heterogeneous. For example, backend workflow subsystems 102 may be associated with different computing applications, computing platforms, business organizations, business purposes, and/or sets of workflow rules. In certain implementations, for example, backend workflow subsystems 102 may be implemented on different computing platforms, using different technologies, for different business purposes, in accordance with different workflow rules, and/or using different data models. As an example, backend data subsystem 102-1 may be implemented and operated by a first organization of an enterprise, backend data subsystem 102-2 may be implemented and operated by a second organization of the enterprise, and backend workflow subsystem 102-N may be implemented and operated by another organization of the enterprise.

Workflow tasks generated, managed, and/or acted on by a particular backend workflow subsystem 102 are native to that particular backend workflow subsystem 102 and may be referred to herein as "native backend workflow tasks" or "native workflow tasks." Because backend workflow subsystems 102 may be heterogeneous, native workflow tasks associated with different backend workflow subsystems 102 may also be heterogeneous.

Backend workflow subsystems 102 may include or be employed by, part of, or otherwise associated with one or more computing applications (e.g., software applications). Accordingly, one or more of the workflow operations performed by backend workflow subsystems 102 may be employed or otherwise utilized by one or more computing applications. Such computing applications may also be heterogeneous. For example, each computing application may employ native technologies, rules, processing, platforms, data models, etc., and/or may be associated with a particular business purpose and/or organization (e.g., billing, purchasing, ordering, provisioning, repairs, accounting, etc.). Such computing applications may be referred to herein as "native computing applications" or "native applications."

Backend workflow subsystems 102 may be configured to communicate with integration subsystem 104 and/or portal subsystem 106. For example, backend workflow subsystems 102 may be configured to generate and send messages (e.g., service calls such as asynchronous web service calls) containing data (e.g., task metadata) representative of backend workflow tasks and/or workflow functions performed in relation to backend workflow tasks to integration subsystem 104 for use by integration subsystem 104 to maintain integrated workflow tasks representative of the backend workflow tasks. As another example, backend workflow subsystems 102 may be configured to communicate with portal subsystem 106 to facilitate portal subsystem 106 providing access to backend workflow tasks and/or functionality through portal 108, as described herein.

Figure 2:
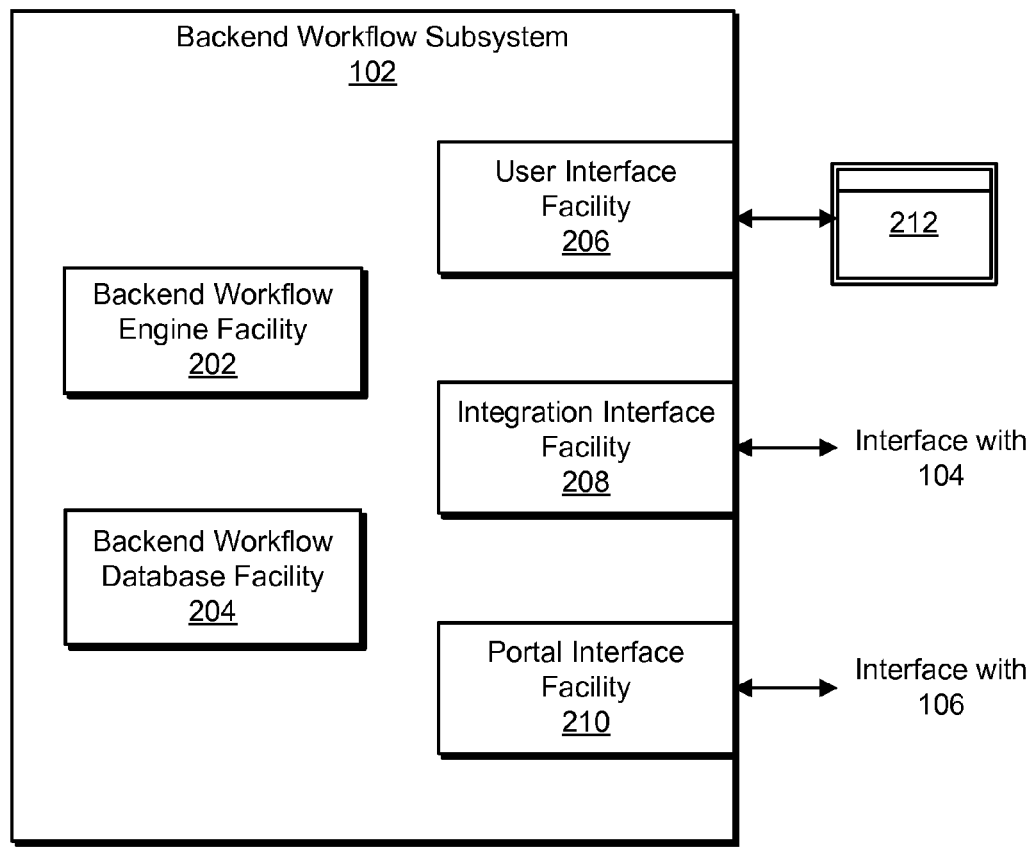
FIG. 2 illustrates exemplary components of a backend workflow subsystem included in the system of FIG. 1 according to principles described herein.

FIG. 2 illustrates exemplary components of a particular backend workflow subsystem 102. The components shown in FIG. 2 are illustrative only. Other backend workflow subsystems 102 may utilize alternative or additional components, omit one or more components shown in FIG. 2, and/or utilize other configurations of components.

As shown in FIG. 2, backend workflow subsystem 102 may include a backend workflow engine facility 202, a backend workflow database facility 204, a user interface facility 206, an integration interface facility 208, and a portal interface facility 210, which may be in communication with one another using any suitable communication technologies such as any of those mentioned herein.

Backend workflow engine facility 202 (or simply "backend engine 202") may be configured to provide backend workflow functionality, including functionality for generating and/or operating on one or more backend workflow tasks native to backend workflow subsystem 102. Backend engine 202 may employ any suitable workflow engine technologies.

Backend workflow database facility 204 (or simply "backend database 204") may be configured to store data representative of backend workflow tasks (e.g., a set of backend workflow tasks) native to backend workflow subsystem 102, as well as any other data related to the workflow tasks (e.g., workflow task metadata).

User interface facility 206 may be configured to generate and provide a user interface 212 through which one or more users may access backend workflow functionality to access and/or perform one or more actions on backend workflow tasks maintained by backend workflow subsystem 102. Accordingly, a user, such as user 110 utilizing access device 112, may access and act on native backend workflow tasks maintained by backend workflow subsystem 102 through user interface 212.

Integration interface facility 208 may be configured to provide an interface through which backend workflow subsystem 102 may interact with integration subsystem 104. Any suitable interface technologies may be employed by integration interface facility 208 to facilitate interaction with integration subsystem 104. In certain implementations, integration interface facility 208 may be configured to generate messages that include data representative of or otherwise descriptive of backend workflow tasks and/or operations performed on backend workflow tasks by backend engine 202 and provide such messages to integration subsystem 104. The messages may be in any suitable form, including service calls (e.g., web service calls) containing metadata representative of or otherwise associated with one or more backend workflow tasks maintained by backend workflow subsystem 102 and/or workflow operations performed by backend workflow subsystem 102. As mentioned, integration interface facility 208 may provide such messages for use by integration subsystem 104 to generate and maintain an integrated workflow that includes data representing the backend workflow tasks maintained by backend workflow subsystem 102.

In certain embodiments, integration interface facility 208 may be configured to dynamically provide metadata (which may be contained in one or more service calls sent by integration interface facility 208) representative of or otherwise descriptive of backend workflow tasks and/or operations performed on backend workflow tasks by backend engine 202 to integration subsystem 104 such that integration subsystem 104 may use the dynamic metadata (which may indicate one or more updates to the backend workflow tasks) to maintain an up-to-date integration workflow that reflects the current state of the backend workflow tasks in backend workflow subsystem 102. In some examples, such data may be provided in accordance with a predetermined data format (e.g., an XML data format) configured to be decoded and interpreted by integration subsystem 104.

Integration interface facility 208 may also be configured to receive messages from integration subsystem 104 for use by backend engine 202 to update or perform other operations on the backend workflow tasks maintained by backend workflow subsystem 102. Accordingly, the workflow tasks maintained by backend workflow subsystem 102 may be updated to reflect changes made to the integrated workflow maintained by integration subsystem 104.

Through the exchange of messages between backend workflow subsystem 102 and integration subsystem 104, data representative of native workflow tasks maintained by backend workflow subsystem 102 and data representative of integrated workflow tasks maintained by integration subsystem 104 and corresponding to the native workflow tasks of backend workflow subsystem 102 may be synchronized in either or both directions between backend workflow subsystem 102 and integration subsystem 104.

Portal Interface facility 210 may be configured to provide an interface for interfacing with portal subsystem 106. Any suitable interface technologies may be employed by portal interface facility 210 to interface with portal subsystem 106. In certain implementations, portal interface facility 210 may employ one or more remote portlet technologies (e.g., WSRP technologies) configured to produce a backend user interface portlet associated with backend workflow subsystem 102 and that may be leveraged by portal subsystem 106 to provide one or more user interfaces in portal 108 for access by user 110. For example, portal interface facility 210 may include a WSRP producer configured to produce a backend user interface portlet that may be consumed by a WSRP consumer at portal subsystem 106 such that portal subsystem 106 may plug the consumed portlet into a portal user interface for user access through portal 108. In certain examples, the portlet produced by portal interface facility 210 may include a portlet version of user interface 212 or otherwise leverage user interface 212 such that the portlet plugged into and provided for access through portal 108 may share one or more attributes of user interface 212 and/or may be configured to act similarly to user interface 212 to provide access to workflow functionality of backend engine 202 and/or backend database 204, without having to implement workflow functionality and/or associated rules of backend engine 202 and/or backend database 204 at portal subsystem 106.

Figure 3:
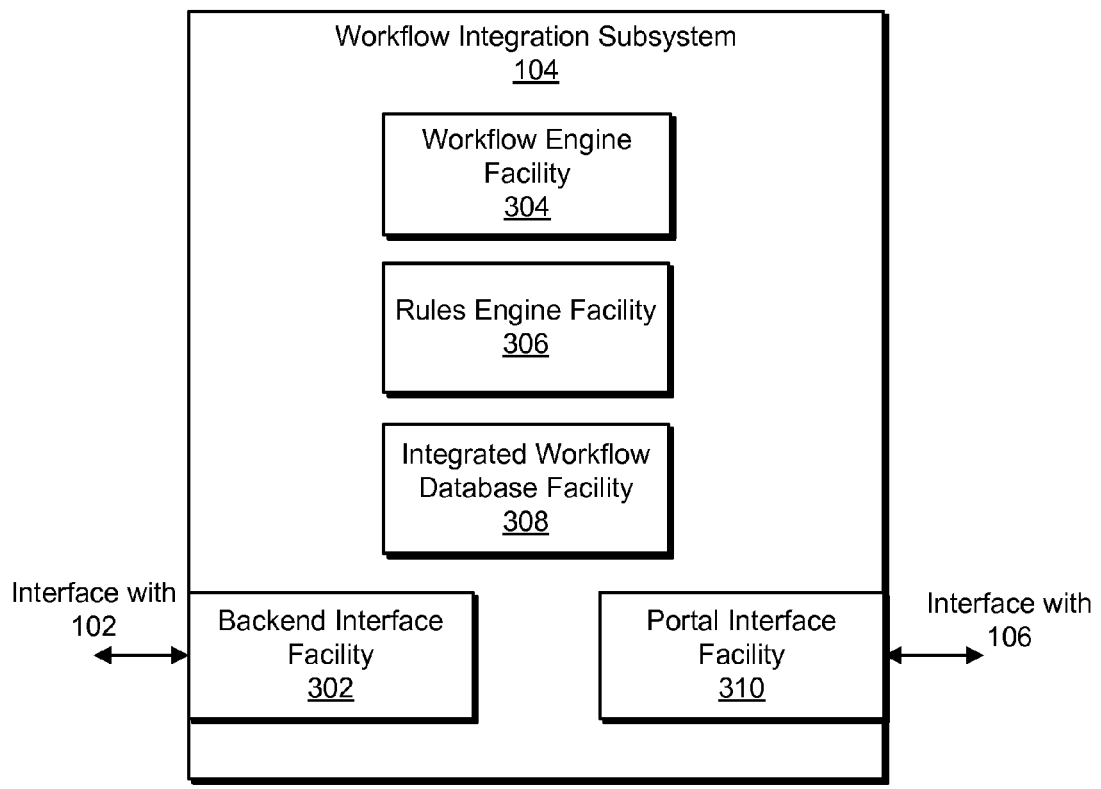
FIG. 3 illustrates exemplary components of a workflow integration subsystem included in the system of FIG. 1 according to principles described herein.

FIG. 3 illustrates exemplary components of integration subsystem 104 of system 100. As shown, integration subsystem 104 may include a backend interface facility 302, a workflow engine facility 304, a rules engine facility 306, an integrated workflow database facility 308, and a portal interface facility 310, which may be in communication with one another using any suitable communication technologies such as any of those mentioned herein.

Backend interface facility 302 may be configured to provide one or more interfaces through which integration subsystem 104 may interact with one or more backend workflow subsystems 102. Any suitable interface technologies may be employed by backend interface facility 302 to facilitate interaction with one or more backend workflow subsystems 102. In certain implementations, for example, backend interface facility 302 may be configured to communicate with integration interface facility 208 of backend workflow subsystem 102 shown in FIG. 2. The communication may include backend interface facility 302 generating and transmitting messages to and/or receiving messages from integration interface facility 208. The messages may be in any suitable form, including service calls (e.g., web service calls) containing metadata representative of or otherwise associated with one or more workflow tasks and/or operations on one or more workflow tasks. For example, messages transmitted by backend interface facility 302 to backend workflow subsystem 102 may include metadata descriptive or otherwise associated with workflow tasks of an integrated workflow maintained by workflow integration subsystem 104. Messages received by backend interface facility 302 from integration interface facility 208 may contain metadata representative or otherwise associated with one or more backend workflow tasks maintained by backend workflow subsystem 102. As described above, through the exchange of messages between backend workflow subsystem 102 and integration subsystem 104, data representative of native workflow tasks maintained by backend workflow subsystem 102 and data representative of integrated workflow tasks maintained by integration subsystem 104 and corresponding to the native workflow tasks of backend workflow subsystem 102 may be synchronized in either or both directions between backend workflow subsystem 102 and integration subsystem 104.

Backend interface facility 302 may be configured to perform one or more operations related to messages received from backend workflow subsystem 102, including validating the messages, triggering exceptions and/or faults as appropriate, and/or routing the messages and/or data included in the messages for further processing by integration subsystem 104. In certain implementations, backend interface facility 302 may employ a service bus (e.g., an enterprise service bus such as Oracle Service Bus) configured to provide one or more services for processing the messages in accordance with a service-oriented architecture.

Backend interface facility 302 may be configured to interact with any number and/or type of backend workflow subsystems 102. For example, for multiple heterogeneous backend workflow subsystems 102, backend interface facility 302 may include multiple modules each configured to interact with a particular one of the backend workflow subsystems 102. In certain implementations, adapters provided by a service bus may be leveraged for interacting with backend workflow subsystems 102.

Workflow engine facility 304 may be configured to provide integrated workflow functionality, including functionality for generating and/or operating on one or more integrated workflow tasks maintained by workflow integration subsystem 104. Workflow engine facility 304 may employ any suitable workflow engine technologies. In certain implementations, for example, workflow engine facility 304 may employ a Business Process Execution Language ("BPEL") based service-oriented architecture ("SOA") configured workflow engine, which may provide support for asynchronous services such that asynchronous service calls (e.g., asynchronous web service calls) may be made to workflow engine facility 304. For example, a service call received by backend interface facility 302 from backend workflow subsystem 102 may be forwarded by backend interface facility 302 to workflow engine facility 304, which may be configured to perform one or more operations based on and in response to the service call. The operations performed in response to the service call may include any suitable workflow functions, including any of those mentioned herein.

Workflow engine facility 304 may be configured to work together with rules engine facility 306 to perform one or more workflow functions based on metadata received from backend workflow subsystem 102. For example, rules engine facility 306 may include and maintain data representative of one or more rules to be used to interpret metadata received from backend workflow subsystem 102. In some examples, rules engine facility 306 may include rules specifying how to interpret metadata from each of a number of heterogeneous backend workflow subsystems 102. Accordingly, workflow engine facility 304 and rules engine facility 306 may work together to interpret metadata received from one or more backend workflow subsystems 102 and to perform one or more integrated workflow functions based on the interpretation of the metadata.

To illustrate, backend interface facility 302 may receive a message from backend workflow subsystem 102 containing metadata representative of a new backend workflow task generated by backend workflow subsystem 102. Backend interface facility 302 may route the metadata to workflow engine facility 304, which may work together with rules engine facility 306 to interpret the metadata based on one or more rules maintained by rules engine facility 306. This may include determining the backend workflow subsystem 102 or related native computing application associated with the metadata, identifying a set of rules associated with the backend workflow subsystem 102 or the related native computing application, and interpreting the metadata in accordance with the identified set of rules. Based on the interpretation of the metadata, workflow engine facility 304 may generate a new integrated workflow task to be maintained by integration subsystem 104. Data representative of the new integrated workflow task may be stored and maintained in integrated workflow database facility 308, which may be configured to store data representative of integrated workflow tasks that make up an integrated workflow maintained by workflow integration subsystem 104, as well as any other data related to the integrated workflow (e.g., integrated workflow task metadata). The integrated workflow may include one or more sets of integrated workflow tasks representative of one or more sets of backend workflow tasks maintained by one or more backend workflow subsystems 102.

Portal interface facility 310 may be configured to provide an interface for interfacing with portal subsystem 106. Any suitable interface technologies may be employed by portal interface facility 310 to interface with portal subsystem 106. Portal interface facility 310 may be configured to provide data representative of one or more integrated workflow tasks, task notifications, task alerts, and/or operations performed on the one or more integrated workflow tasks from integration subsystem 104 to portal subsystem 106 for use by portal subsystem 106 to generate and provide portal 108 to a user. Portal interface facility 310 may be configured to obtain such data from workflow engine facility 304 and/or integrated workflow database facility 308. Portal interface facility 310 may also be configured to receive data from portal subsystem 106, including data representative of requests provided by a user through portal 108. Accordingly, through portal interface facility 310, integration subsystem 104 may receive requests from portal subsystem 106 and respond by performing one or more integrated workflow functions and/or providing appropriate data to portal subsystem 106 for use by portal subsystem 106 in generating and providing content in portal 108.

Figure 4:
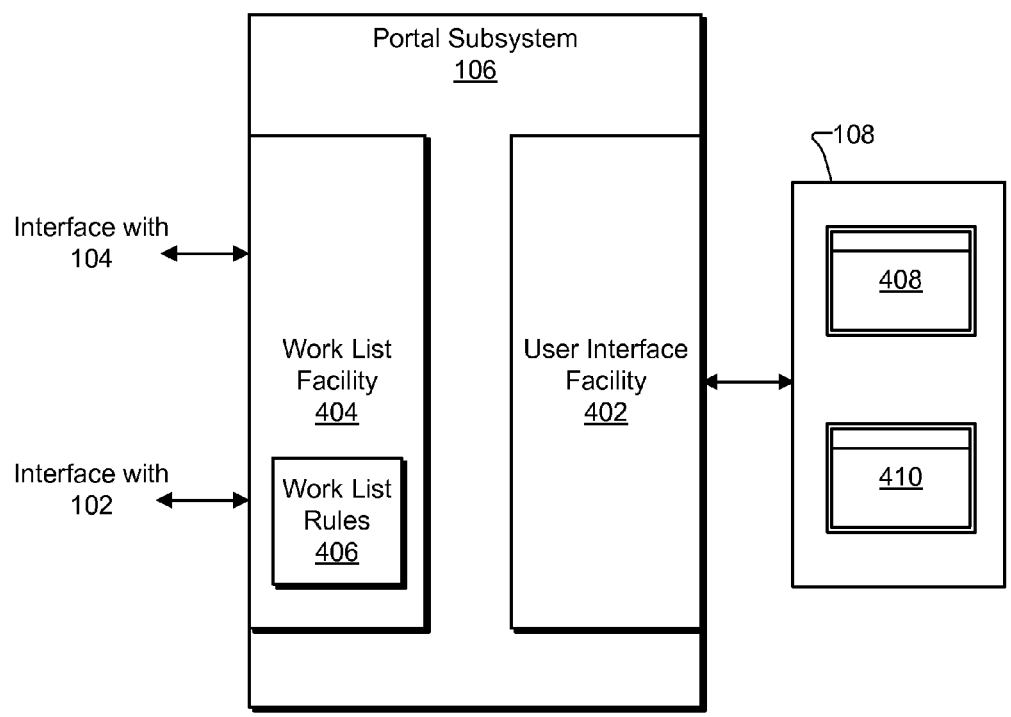
FIG. 4 illustrates exemplary components of a portal subsystem included in the system of FIG. 1 according to principles described herein.

FIG. 4 illustrates exemplary components of portal subsystem 106. As shown, portal subsystem 106 may include a user interface facility 402 and a work list facility 404, which may be in communication with one another using any suitable communication technologies such as any of those mentioned herein.

User interface facility 402 may be configured to provide frontend portal 108 through which one or more users, such as user 110, may gain access to workflow tasks, workflow task information (e.g., task notifications and/or alerts), and/or workflow functionality in order to access and/or perform one or more actions on one or more workflow tasks, including integrated workflow tasks maintained by integration subsystem 104 and/or backend workflow tasks that are maintained by one or more backend workflow subsystems 102. Portal 108 may be provided in any suitable form. For example, portal 108 may include one or more graphical user interfaces ("GUIs") that may be displayed for consideration and utilization by a user. In certain implementations, user interface facility 402 may be configured to dynamically plug one or more portlets into one or more GUIs for display in portal 108.

Portal 108 may provide a centralized access point through which a user may access tasks, task information, and task functionality associated with multiple backend workflow subsystems 102. Accordingly, portal 108 may provide a single access point for a user to receive task notifications and/or alerts that may be helpful to inform the user when attention to and/or actions on tasks are needed. In some implementations, portal 108 may also provide the user with access to task status and/or history reports. In certain implementations, portal 108 may be configured to provide uniform user interfaces to facilitate a uniform experience for a user who accesses user interfaces generated under the control of portal subsystem 106.

Through portal 108 a user may interact with work list facility 404, including providing input to work list facility 404. For example, user interface facility 402 may receive a request provided by a user through portal 108 and provide data representative of the request to work list facility 404, which may process the user request in any of the ways described herein. User interface facility 402 may also receive output from work list facility 404 and use the output to provide portal 108, such as by using the output from work list facility 404 to generate and/or populate one or more GUIs in portal 108.

Work list facility 404 may be configured to process user requests received through portal 108 as may suit a particular implementation. In certain embodiments, work list facility 404 may be configured to process user requests received through portal 108 in accordance with a predefined set of rules such as a set of predefined work list rules 406 associated with or otherwise accessible to work list facility 404. While work list rules 406 are shown within work list facility 406 in FIG. 4, this is illustrative only. Additionally or alternatively, work list rules may be external to and accessible by work list facility 404. For example, work list rules 406 may be maintained in integrated workflow database facility 308 in certain implementations in which work list facility 404 is configured to access data in integrated workflow database facility 308.

Work list rules 406 may specify one or more conditions to be considered by work list facility 404 to determine how to process user requests received through portal 108. The predefined work list rules 406 may specify any conditions that may be helpful for determining how to process user requests. For example, the predefined work list rules 406 may specify one or more operations to be performed by work list facility 404 based on the workflow functionality being requested by a request (e.g., whether the request is to access, approve, reject, or perform another function on a workflow task), the backend workflow system 102 associated with a request (e.g., the backend workflow system 102 maintaining a backend workflow task associated with the request), and/or any other parameter specified by or otherwise associated with a request. The work list rules may be defined as may suit a particular implementation of system 100 (e.g., as may suit a particular integration or level of integration of a backend workflow system 102 with integration subsystem 104).

As an example, work list rules 406 may specify one or more conditions configured to be used by work list facility 404 to determine whether processing of a request will be subject to control by portal subsystem 106 or by a backend workflow subsystem 102. For instance, based on work list rules 406 and/or one or more parameters associated with a user request, work list facility 406 may process the request by providing portal access to workflow functionality that is subject to control by either portal subsystem 106 (e.g., work list facility 404) or a particular backend workflow subsystem 102. Examples of parameters associated with the request that may be used by work list facility 404 to make this determination may include, without limitation, the workflow functionality being requested by the request (e.g., whether the request is to access, approve, reject, or perform another function on a workflow task), the backend workflow system 102 associated with a request (e.g., the backend workflow system 102 maintaining a backend workflow task associated with the request), and/or any other parameter specified by or otherwise associated with a request.

In certain implementations, work list rules 406 may specify, for each of backend workflow subsystems 102 in system 100, which workflow functions will be provided subject to control by portal subsystem 106 and which workflow functions will be provided subject to control by the particular backend workflow subsystem. For example, within work list rules 406, for a backend workflow subsystem 102, a first set of workflow functions may be specified as being subject to control by portal subsystem 106 and a second set of workflow functions may be specified as being subject to control by the backend workflow subsystem 102. In such implementations, in response to a user request received through portal 108, work list facility 404 may determine which of backend workflow subsystems 102 is associated with the request (e.g., a particular backend workflow subsystem 102 specified by the request and/or maintaining a backend workflow task associated with the request). Once the backend workflow subsystem 102 is determined, work list facility 404 may determine a workflow function requested by the request. Based on the requested workflow function, work list facility 404 may query work list rules 406 to determine whether to provide access to the workflow function subject to control by portal subsystem 106 or the backend workflow subsystem 102. Accordingly, in certain examples, for a first user request for a first workflow function, work list facility 404 may elect to process the first user request by providing access to the first workflow function subject to control by portal subsystem 106 and, for a second user request for a second workflow function, work list facility 404 may elect to process the second user request by providing access to the second workflow function subject to control by the backend workflow subsystem.

As mentioned, system 100 may support various levels of integration of backend workflow tasks and/or functionality associated with one or more backend workflow subsystems 102 into integration subsystem 104. To this end, in certain implementations, work list rules 406 may be defined to support various levels of integration of backend workflow tasks and/or functionality into integration subsystem 104. To illustrate, several exemplary levels of integration will now be described, including full-level, summary-level, and hybrid-level integrations.

In a full-level integration of a particular backend workflow subsystem 102 into integration subsystem 104, all details of the backend workflow tasks and all workflow functionality provided by the backend workflow subsystem 102 may be integrated into integration subsystem 104. Accordingly, integration subsystem 104 may maintain integrated workflow tasks that represent all details of the backend workflow tasks. In addition, integration subsystem 104 may be configured with integrated workflow functionality that mirrors all of the backend workflow functionality of the backend workflow subsystem 102 such that integration subsystem 104, subject to control by portal subsystem 106, is capable of operating on the integrated workflow tasks in the same way that the backend workflow subsystem 102 is capable of operating on the backend workflow tasks maintained by the backend workflow subsystem 102.

In such a full-level integration, work list rules 406 may be configured such that work list facility 404 of portal subsystem 106, upon detecting that a user request received through portal 108 is associated with the fully-integrated backend workflow subsystem 102, may determine that the user request is to be processed subject to control by portal subsystem 106. Work list facility 404 may then interact with integration subsystem 104 to access and execute integrated workflow functionality of integration subsystem 104 directly on one or more integrated workflow tasks maintained by integration subsystem 104.

As an example, if a user request is to access information about a workflow task associated with the fully-integrated backend workflow subsystem 102, work list facility 404 may access workflow functionality of integrated subsystem 104 to obtain data representative of the information directly from integrated workflow database facility 308. Work list facility 404 may provide the obtained data to user interface facility 402, which may use the data to populate a GUI in portal 108, thereby fulfilling the user request.

As another example, if a user request is to update information related to a workflow task associated with the fully-integrated backend workflow subsystem 102, work list facility 404 may access and apply workflow functionality of integrated subsystem 104 to update data representative of the information in integrated workflow database facility 308. In response to the data being updated in integrated workflow database facility 308, integration subsystem 104 may notify the backend workflow subsystem 102 of the update, and the backend workflow subsystem 102, in response to the notification, may apply backend workflow functionality to update the corresponding backend workflow task to reflect the update to the integrated workflow task. In this or a similar manner, updates to the integrated workflow maintained by integration subsystem 104 may be propagated through to the appropriate backend workflow subsystems 102.

In a summary-level integration of a particular backend workflow subsystem 102 into integration subsystem 104, only summary information about the backend workflow tasks and workflow functionality provided by the backend workflow subsystem 102 for accessing the summary information may be integrated into integration subsystem 104. Accordingly, integration subsystem 104 may maintain integrated workflow tasks that represent only summary information about the backend workflow tasks. In addition, integration subsystem 104 may be configured with only integrated workflow functionality needed for accessing the summary information such that integration subsystem 104, subject to control by portal subsystem 106, is capable of accessing and providing the summary information for presentation in portal 108. Accordingly, the summary task information maintained by integration subsystem 104 may be accessed and provided through portal 108 subject to control by portal subsystem 106. Other backend workflow task details and/or functionality of the backend workflow subsystem 102 may also be accessed through portal 108, but subject to control by the backend workflow subsystem 102.

In such a summary-level integration, work list rules 406 may be configured such that work list facility 404 of portal subsystem 106, upon detecting that a user request received through portal 108 is associated with the summary-level-integrated backend workflow subsystem 102, may determine the workflow functionality being requested by the user request. If the requested workflow functionality is to access the summary information about a workflow task, work list facility 404 may determine that the user request is to be processed subject to control by portal subsystem 106. Work list facility 404 may then interact with integration subsystem 104 to access and execute integrated workflow functionality of integration subsystem 104 directly on the summary task information maintained by integration subsystem 104 to obtain data representative of the summary information directly from integrated workflow database facility 308. Work list facility 404 may provide the obtained data to user interface facility 402, which may use the data to populate a GUI with the summary information in portal 108, thereby fulfilling the user request.

If, on the other hand, the requested workflow functionality is functionality other than accessing only the summary information about a workflow task, work list facility 404 may determine that the user request is to be processed subject to control by the backend workflow subsystem 102. Work list facility 404 may then interact with the backend workflow subsystem 102 to pass the request and control of the processing of the request to the backend workflow subsystem 102. The backend workflow subsystem 102 may receive and process the request in accordance with rules associated with the backend workflow subsystem 102.

As described above, the backend workflow subsystem 102 may be configured to produce a user interface portlet for use by portal subsystem 106 to display, in portal 108, content related to the workflow functionality performed by the backend workflow subsystem 102. To this end, work list facility 404 may be configured to leverage the remote user interface portlet of the backend workflow subsystem 102 to generate and provide a user interface in portal 108. For example, work list facility 404 may include a WSRP consumer that consumes a WSRP-based portlet produced by the backend workflow subsystem 102. Work list facility 404 may output data representative of the consumed portlet to user interface facility 402, which may plug the content of the portlet into a user interface presented in portal 108. Accordingly, a user of portal 108 may view and interact with the backend workflow subsystem 102, including accessing workflow functionality controlled by the backend workflow subsystem 102, through portal 108.

In certain embodiments, portal subsystem 106 may be configured to leverage the remote portlet as described herein and to generate and display a user interface in the form of a pop-up window in portal 108. The pop-up window may include the consumed WSRP-based portlet produced by the backend workflow subsystem 102. Through the pop-up window in portal 108, a user may access backend workflow functionality of the backend workflow subsystem 102, which workflow functionality may be applied directly to one or more backend workflow tasks maintained by the backend workflow subsystem 102.

FIG. 4 illustrates user interfaces 408 and 410 in portal 108. User interface 408 may represent a user interface generated and provided in response to or when a user request is processed subject to control by portal subsystem 106. Hence, portal subsystem 106 may control the functionality associated with and the content of user interface 408. User interface 410 may represent a user interface generated and provided in response to or when a user request is processed subject to control by the backend workflow subsystem 102. Hence, the backend workflow subsystem 102 may control the functionality associated with and the content of user interface 410. User interface 410 may include a remote portlet and/or may be a pop-up window as described above.

As an example of processing a user request in a summary-level workflow integration, if a user request is to access additional information (e.g., details not included in the summary information) about a workflow task associated with the summary-level-integrated backend workflow subsystem 102, work list facility 404 may pass the request and control to the backend workflow subsystem 102 in any of the ways described herein such that the backend workflow subsystem 102 may access backend workflow functionality of the backend workflow subsystem 102 to obtain data representative of the additional information directly from backend database 204 of the backend workflow subsystem 102. The backend workflow subsystem 102 may provide the additional information to portal user interface 210 of backend workflow subsystem 102, which may provide the additional information to work list facility 404 of portal subsystem 108 for display in portal 108. As described herein, in certain embodiments, portal interface facility 210 of the backend workflow subsystem 102 may include a WSRP producer that may produce a portlet containing the additional information, and work list facility 404 of portal subsystem 106 may include a WSRP consumer that may consume the portlet. Portal subsystem 106 may use the consumed portlet to populate a user interface in portal 108 such that a user may view the additional information.

As another example, if a user request is to update information related to a workflow task associated with the summary-level-integrated backend workflow subsystem 102, work list facility 404 may pass the request and control to the backend workflow subsystem 102 in any of the ways described herein such that the backend workflow subsystem 102 may access backend workflow functionality of the backend workflow subsystem 102 to update data representative of the backend workflow task in backend database 204 of the backend workflow subsystem 102. If the update to the backend workflow task updates summary information related to the workflow task, then in response to the data being updated in backend database 204, the backend workflow subsystem 102 may notify integration subsystem 104 of the update, and integration subsystem 104, in response to the notification, may update the corresponding integrated workflow task summary information to reflect the update to the backend workflow task. In this or a similar manner, updates to backend workflow tasks maintained by backend workflow subsystems 102 may be propagated through to the integrated workflow maintained by integration subsystem 104.

In a hybrid-level integration of a particular backend workflow subsystem 102 into integration subsystem 104, certain, but not all, information about the backend workflow tasks and workflow functionality provided by the backend workflow subsystem 102 may be integrated into integration subsystem 104. Accordingly, integration subsystem 104 may maintain integrated workflow tasks that represent certain information about the backend workflow tasks. In addition, integration subsystem 104 may be configured with workflow functionality that mirrors only certain backend workflow functionality of the backend workflow subsystem 102. For other backend workflow functionality of the backend workflow subsystem 102 not integrated into integration subsystem 104, portal subsystem 106 may be configured to pass control to the backend workflow subsystem 102 to perform the non-integrated backend workflow functionality. Accordingly, integrated workflow task information and functionality may be accessed through portal 108 subject to control by portal subsystem 106 and non-integrated workflow task information and functionality may be accesses through portal subject to control by the backend workflow subsystem 102.

In such a hybrid-level integration, work list rules 406 may be configured such that work list facility 404 of portal subsystem 106, upon detecting that a user request received through portal 108 is associated with the hybrid-level-integrated backend workflow subsystem 102, may determine the workflow functionality being requested by the user request. If the requested workflow functionality is to access integrated workflow task information or to otherwise perform integrated workflow functionality, work list facility 404 may determine that the user request is to be processed subject to control by portal subsystem 106. Work list facility 404 may then interact with integration subsystem 104 to access and execute integrated workflow functionality of integration subsystem 104 directly on the integrated workflow task information maintained by integration subsystem 104, thereby fulfilling the request. Work list facility 404 may provide a user interface in portal 108 through which the user may view information related to the execution of the workflow functionality.

If, on the other hand, the requested workflow functionality is non-integrated functionality, work list facility 404 may determine that the user request is to be processed subject to control by the backend workflow subsystem 102. Work list facility 404 may then interact with the backend workflow subsystem 102 to pass the request and control of the processing of the request to the backend workflow subsystem 102. As described herein, work list facility 404 may leverage a remote portlet produced by the backend workflow subsystem 102 to generate and provide a user interface (e.g., a pop-up window) in portal 108 such that a user may view information related to the execution of the non-integrated workflow functionality in portal 108. For example, work list facility 404 may include a WSRP consumer that consumes a WSRP-based portlet produced by the backend workflow subsystem 102. Work list facility 404 may output data representative of the consumed portlet to user interface facility 402 for use in generating and providing a user interface including the portlet in portal 108. Accordingly, a user of portal 108 may view and interact with the backend workflow subsystem 102, including accessing non-integrated workflow functionality controlled by the backend workflow subsystem 102, through portal 108.

As an example, if a user request is to access additional information (e.g., task details not integrated into integration subsystem 104) about a workflow task associated with the hybrid-level-integrated backend workflow subsystem 102, work list facility 404 may pass the request and control to the backend workflow subsystem 102 in any of the ways described herein such that the backend workflow subsystem 102 may access backend workflow functionality of the backend workflow subsystem 102 to obtain data representative of the additional information directly from backend database 204 of the backend workflow subsystem 102. The backend workflow subsystem 102 may provide the additional information to portal user interface 210 of backend workflow subsystem 102, which may provide the additional information to work list facility 404 of portal subsystem 108 for display in portal 108. As described herein, in certain embodiments, portal interface facility 210 of the backend workflow subsystem 102 may include a WSRP producer that may produce a portlet containing the additional information, and work list facility 404 of portal subsystem 106 may include a WSRP consumer that may consume the portlet. Portal subsystem 106 may use the consumed portlet to populate a user interface in portal 108 such that a user may view the additional information.

As another example, if a user request is to update information related to a workflow task associated with the hybrid-level-integrated backend workflow subsystem 102, work list facility 404 may determine that the update requires non-integrated functionality and may pass the request and control to the backend workflow subsystem 102 in any of the ways described herein such that the backend workflow subsystem 102 may access backend workflow functionality of the backend workflow subsystem 102 to update data representative of the backend workflow task in backend database 204 of the backend workflow subsystem 102. If the update to the backend workflow task updates information related to the workflow task that is integrated, then in response to the data being updated in backend database 204, the backend workflow subsystem 102 may notify integration subsystem 104 of the update, and integration subsystem 104, in response to the notification, may apply integrated workflow functionality to update the corresponding integrated workflow task to reflect the update to the backend workflow task. In this or a similar manner, updates to backend workflow tasks maintained by backend workflow subsystems 102 may be propagated through to the integrated workflow maintained by integration subsystem 104.

In a hybrid-level integration, any subset of backend workflow task information and functions may be integrated into integration subsystem 104 as may suit a particular implementation. For example, relatively simple workflow functions (e.g., accessing, approving, and/or rejecting tasks) may be integrated while more complicated workflow functions may not be integrated and left for processing subject to control by the backend workflow subsystem 102.

Figure 5:
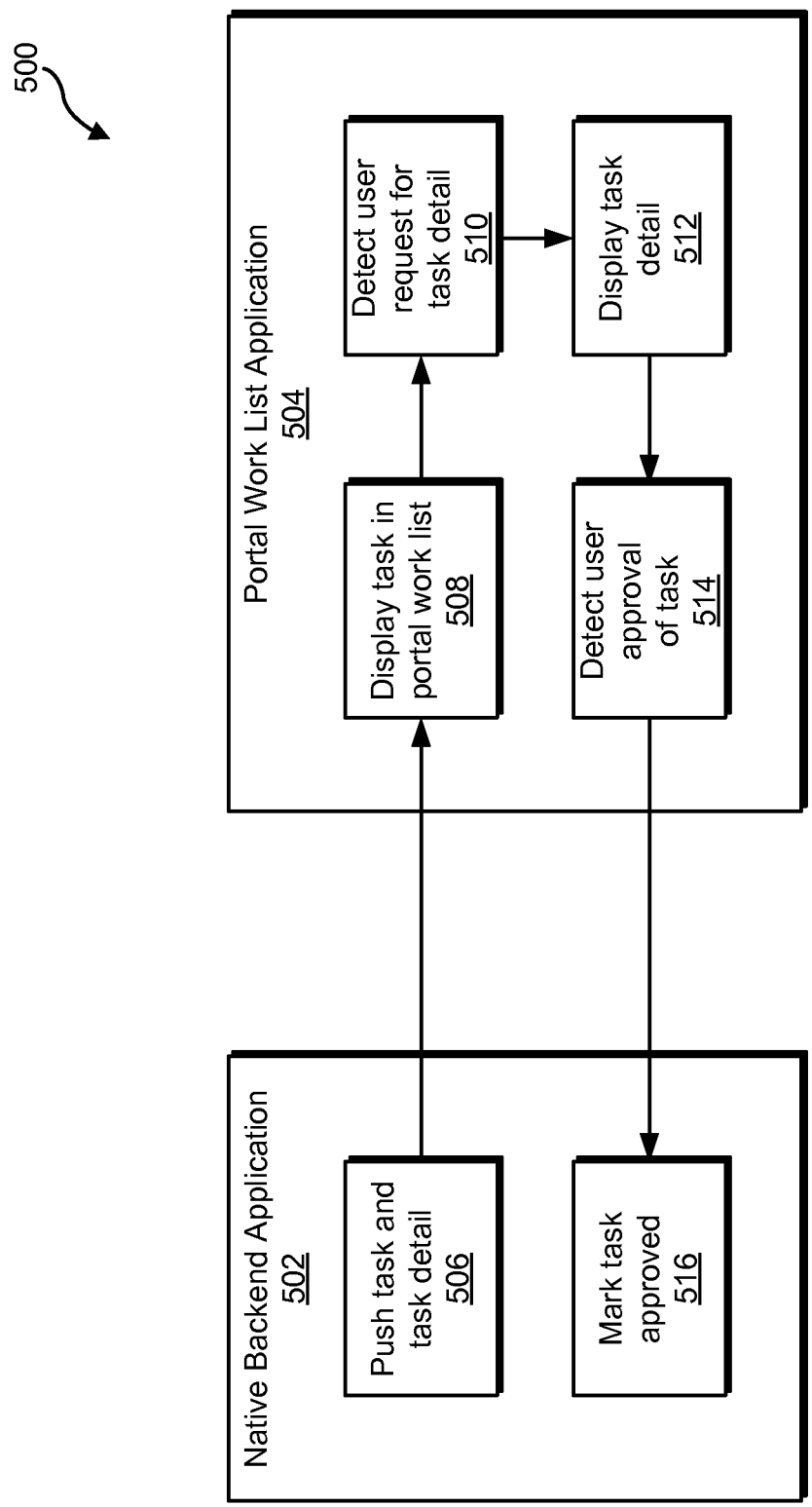
FIGS. 5-7 illustrate examples of process flows for exemplary full, summary, and hybrid level workflow integrations.
Figure 6:
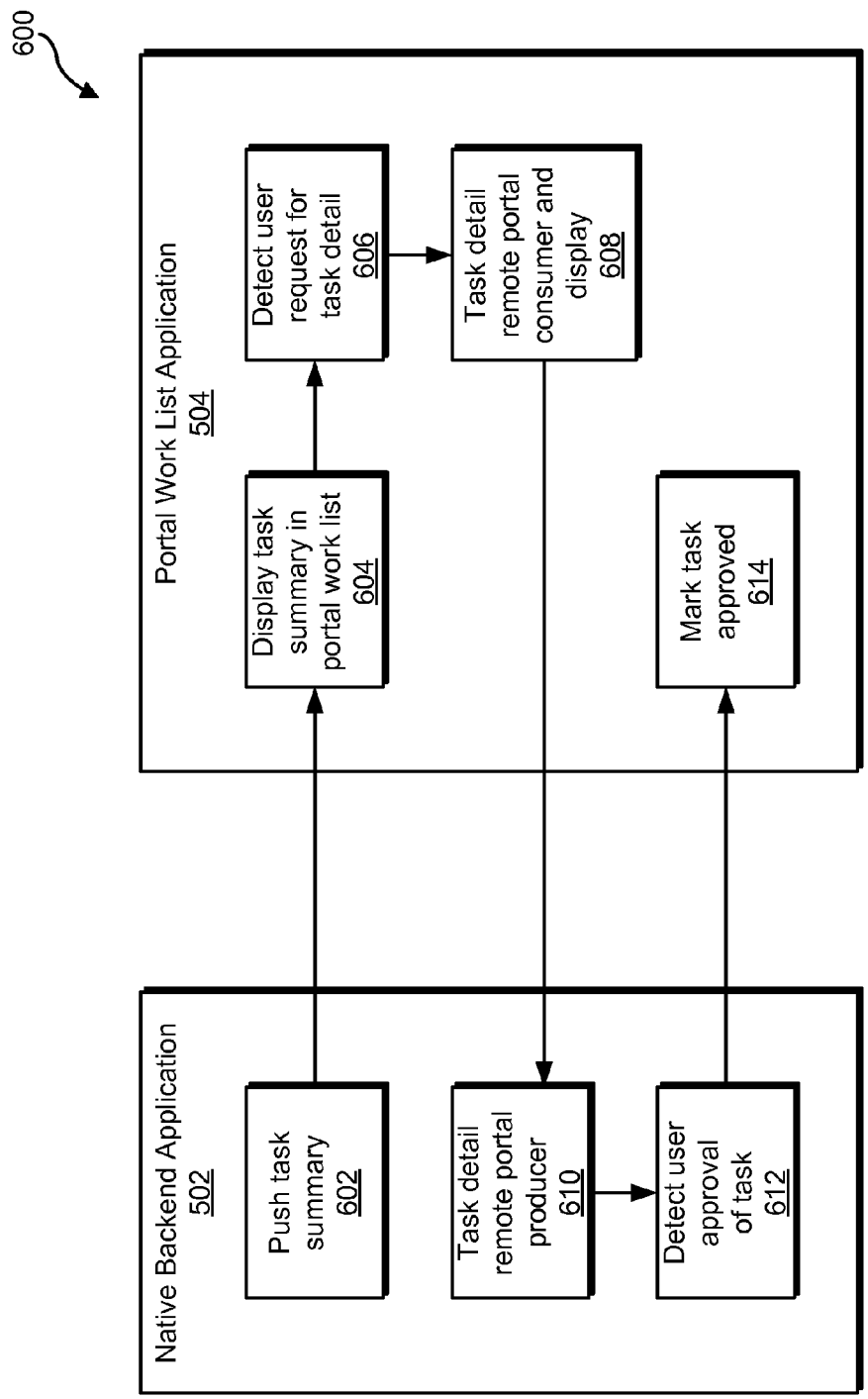
Figure 7:
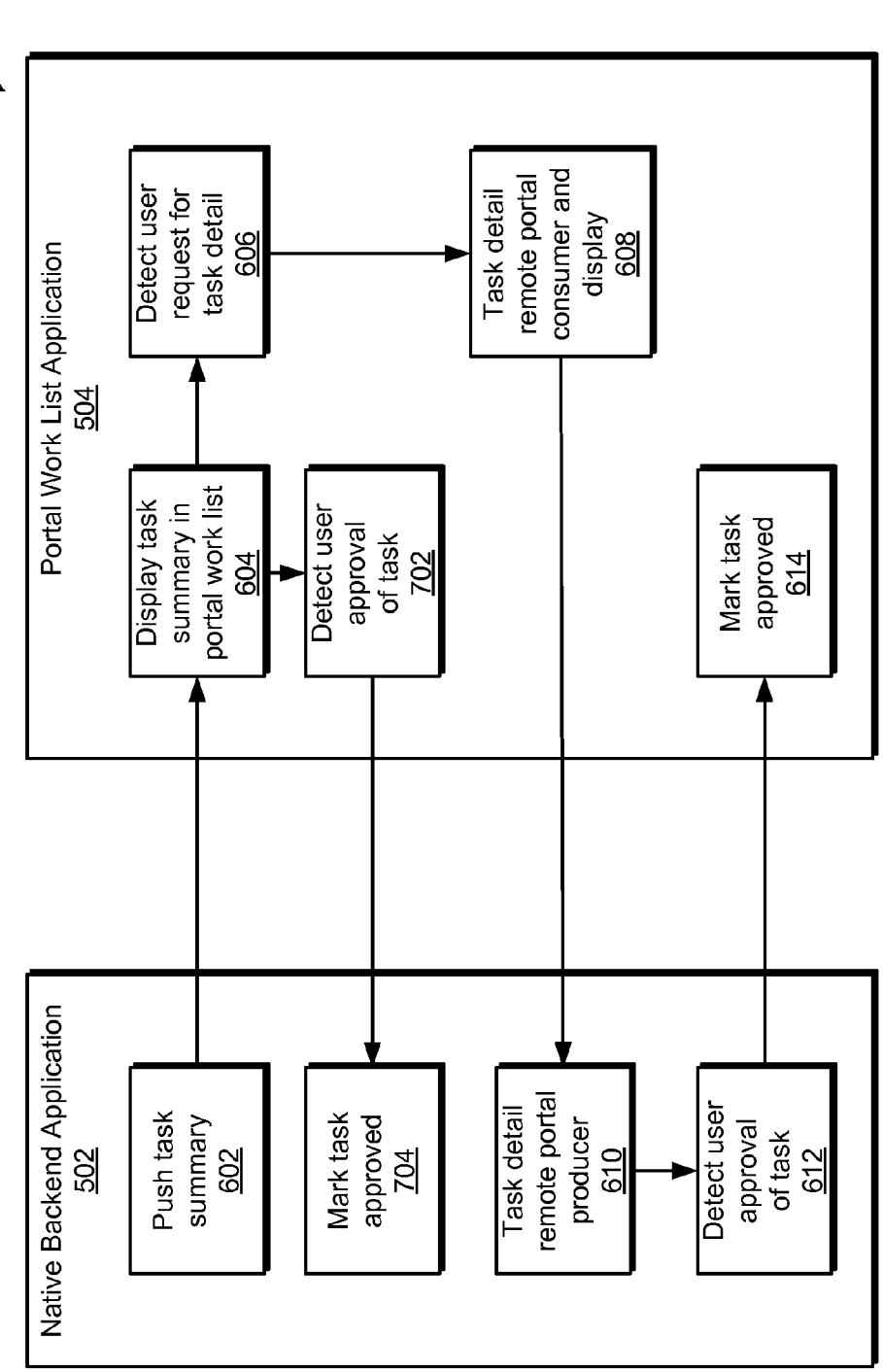

FIGS. 5-7 illustrate examples of process flows for exemplary full, summary, and hybrid level workflow integrations. Each of FIGS. 5-7 will now be described.

FIG. 5 illustrates a process flow 500 for an exemplary full-level workflow integration. In FIG. 5, a native backend application 502 represents a backend computing application associated with (e.g., part of, including, implementing, or implemented by) a backend workflow subsystem 102, and portal work list application 504 represents a computing application associated with (e.g., part of, including, implementing, or implemented by) integration subsystem 104 and/or portal subsystem 104 (e.g., work list facility 404 of portal subsystem 106). In the exemplary full-level workflow integration, all backend workflow tasks and functionality associated with native backend application 502 are integrated into integration subsystem 104.

Processing flow 500 may begin at step 506, in which step native backend application 502 may push data representative of a backend workflow task and details about the task to integration subsystem 104. Step 506 may be subject to control by native backend application 502 and may be performed to integrate backend workflow task into integration subsystem 104.

In step 508, portal work list application 504 may display task information in a portal work list in portal 108. For example, a user may access portal 108 and provide a request for a portal work list to be displayed in portal 108. For instance, an employee of an enterprise may submit a request to view a portal work list including summary information for any pending workflow tasks associated with the employee (any pending tasks awaiting approval by the employee).

In step 510, portal work list application 504 may detect a user request to view details about a workflow task. For example, the user viewing the portal work list in portal 108 may select a particular workflow task from the work list. The selection may indicate the user's request to view additional details about the workflow task.

In step 512, additional details about the workflow task may be displayed by portal work list application 504. For example, in response to the user request in step 510, portal work list application 504 may communicate with integration subsystem 104 to access the task details stored in integrated workflow database facility 308 and provide the task details for display in portal 108. Because the task details are stored in integrated workflow database facility 308, portal work list application 504 may perform step 512 subject to control by portal work list application 504 to directly access the task details in integrated workflow database facility 308 and without having to communicate with native backend application 502 to access the task details.

In step 514, portal work list application 504 may detect a user approval of the workflow task. For example, while viewing summary or detailed information about the workflow task in portal 108, the user may provide a command indicating the user's approval of the workflow task. In response, portal work list application 504 may communicate with integration subsystem 104 to access workflow functionality of integration subsystem 104 to mark the integrated workflow task stored in integrated workflow database facility 308 as approved by the user. Portal work list application 504 may notify native backend application 502 that the integrated workflow task has been marked as approved by the user. In response, in step 516, native backend application 502 may mark the corresponding backend workflow task as approved by the user.

Because process flow 500 shown in FIG. 5 is associated with a full-level integration, portal work list application 504 may control workflow functionality for displaying task summary information and detailed information in portal 108. Portal work list application 504 may also control accessing and performing workflow functionality, such as functionality to mark tasks as approved in response to user requests to approve the tasks. Steps 506 and 516 performed by native backend application 502 may be performed for the purpose of integrating the backend workflow tasks and functionality associated with native backend application 502 with integrated subsystem 104, and to keep backend workflow tasks current with integrated workflow tasks and vice versa. In certain implementations, communications between native backend application 502 and portal work list application 504 in process flow 500 may include web service calls.

FIG. 6 illustrates a process flow 600 for an exemplary summary-level workflow integration. In the exemplary summary-level workflow integration, only summary information for backend workflow tasks associated with native backend application 502 and functionality for accessing the summary information are integrated into integration subsystem 104.

Processing flow 600 may begin at step 602, in which step native backend application 502 may push data representative of summary information for a backend workflow task to integration subsystem 104. Step 602 may be subject to control by native backend application 502 and may be performed to integrate summary information for the backend workflow task into integration subsystem 104.

In step 604, portal work list application 504 may display task summary information in a portal work list in portal 108. In step 606, portal work list application 504 may detect a user request to view details about a workflow task, as described herein.

In step 608, additional details about the workflow task may be displayed by portal work list application 504. However, because the task details are not integrated in integration subsystem 104, portal work list application 504 may pass the request and control of processing the request to native backend application 502. For example, in step 608, portal work list application 504 may pass the request to native backend application 502. In step 610, native backend application 502 may access backend workflow functionality to access the task details maintained by native backend application 502 and utilize a WSRP producer to produce a backend user interface portlet that contains the task details. In step 608, portal work list application 504 may utilize a WSRP consumer to consume the backend user interface portlet for display in portal 108. Accordingly, a user may utilize portal 108 to view the task details accessed by native backend application 502.

In step 612, native backend application 502 may detect a user approval of the workflow task. For example, while viewing detailed information about the workflow task in the remote portlet in portal 108, the user may provide a command indicating the user's approval of the workflow task. Because control has been passed to native backend application 502, native backend application 502 may detect the request and respond by accessing backend workflow functionality of native backend application 502 to mark the backend workflow task under the control of native backend application 502 as approved by the user. Native backend application 502 may notify portal work list application 504 that the backend workflow task has been marked as approved by the user. In response, in step 614, portal work list application 504 may mark the corresponding integrated workflow task as approved by the user.

Because process flow 600 shown in FIG. 6 is associated with a summary-level workflow integration, portal work list application 504 may control workflow functionality for displaying task summary information in portal 108. However, native backend application 502 may control accessing and performing other workflow functionality, such as functionality to access task details and mark tasks as approved in response to user requests to approve the tasks. In certain implementations, communications between native backend application 502 and portal work list application 504 in process flow 600 may include a combination of web service calls and WSRP-based communications.

FIG. 7 illustrates a process flow 700 for an exemplary hybrid-level workflow integration. In the exemplary hybrid-level workflow integration, summary information for backend workflow tasks associated with native backend application 502 and certain backend workflow functionality are integrated into integration subsystem 104.

FIG. 7 shows two possible process flow paths within process flow 700. In the first illustrated process flow path, steps 602 through 614 may be performed as described above in reference to FIG. 6. In the second illustrated process flow path, steps 602 and 604 may be performed as described above in reference to FIG. 6. However, instead of next detecting a user request for additional information about the workflow task, portal work list application 504 may detect user approval of the workflow task in step 702. For example, while viewing summary information about the workflow task in portal 108, the user may provide a command indicating the user's approval of the workflow task. Because control remains with portal work list application 504 at this step, portal work list application 504 may detect the user approval and respond by communicating with integration subsystem 104 to access workflow functionality of integration subsystem 104 to mark the integrated workflow task stored in integrated workflow database facility 308 as approved by the user. Portal work list application 504 may notify native backend application 502 that the integrated workflow task has been marked as approved by the user. In response, in step 704, native backend application 502 may mark the corresponding backend workflow task as approved by the user.

Because process flow 700 shown in FIG. 7 is associated with a particular hybrid-level workflow integration, portal work list application 504 may control workflow functionality for displaying task summary information in portal 108 and accessing workflow functionality to approve integrated workflow tasks. However, native backend application 502 may control accessing and performing other workflow functionality, such as functionality to access task details and perform other actions on tasks. In certain implementations, communications between native backend application 502 and portal work list application 504 in process flow 700 may include a combination of web service calls and WSRP-based communications.

Any number of backend workflow subsystems 102 may be integrated into integration subsystem 104 using any of the exemplary levels of integration described herein. Referring again to FIG. 1, for example, multiple backend workflow subsystems 102 may be concurrently integrated into integration subsystem 104. Each of the backend workflow subsystems 102 may be integrated in accordance with any of the exemplary integration levels described herein. For example, backend workflow subsystem 102-1 may be integrated in accordance with a full-level workflow integration, backend workflow subsystem 102-2 may be integrated in accordance with a summary-level workflow integration, and backend workflow subsystem 102-N may be integrated in accordance with a hybrid-level workflow integration. Such integrations may be maintained simultaneously by integration subsystem 104. Accordingly, system 100 may support flexible integrations of one or more backend workflow subsystems 102, as may suit the backend workflow subsystems 102.

A full-level workflow integration may be well-suited for a backend workflow subsystem 102 having relatively low complexity (e.g., relatively simple business rules and/or logic). Such a full-level integration may emulate backend workflow functionality and may provide a uniform user interface experience for a user. In addition, a full-level integration may be implemented without implementing remote portal technologies at the backend workflow subsystem 102.

A summary-level workflow integration may be well-suited for a backend workflow subsystem 102 having a relatively high level of complexity (e.g., relatively complex business rules and/or logic). In a summary-level integration, the backend workflow subsystem 102 may maintain control of user interfaces. In addition, there is no need to emulate backend workflow functionality and/or related rules within integration subsystem 104.

A hybrid-level workflow integration may be well-suited for a backend workflow subsystem 102 having both relatively low and high complexity (e.g., having certain business rules and/or logic with relatively low complexity as well as other business logic and/or rules of relatively high complexity). A hybrid-level workflow integration may be implemented flexibly to allow for any subset of backend workflow functionality to be implemented in integration subsystem 104. A hybrid-level workflow integration may also provide a user accessing portal 108 with flexibility in accessing workflow functionality. For example, the user may be able to indicate approval of a task from an integrated summary information view or from a non-integrated detailed information level.

In implementations in which backend workflow functionality is accessed through portal 108, any updates to the backend workflow functionality and/or associated workflow rules is automatically carried through to portal 108, without having to carry the updates into integration subsystem 104. This may help minimize labor and/or resources that would be required to maintain a duplicate level of workflow functionality and/or user interface layer. That is, if desired by a developer, workflow functionality and/or associated rules may be kept separate from integration subsystem 104.

As mentioned, portal subsystem 106 may be configured to provide portal 108 in which one or more views of information related to workflow task may be provided. Through portal 108, a user may provide one or more requests to access workflow functionality to perform one or more operations on the workflow tasks represented within portal 108. In certain embodiments, portal subsystem 106 may be configured to support performance of batch operations on multiple workflow tasks in response to a user request received through portal 108. For example, portal 108 may display a work list view including information about multiple workflow tasks. Through portal 108 a user may select one or more of the workflow tasks represented in portal 108 and provide a command to request that a particular workflow function be applied to the selected workflow tasks. Portal subsystem 106 may detect the request and initiate processing of the batch of selected workflow tasks in accordance with the request. The processing may be performed in any of the ways described herein, including subject to control by portal subsystem 106 and/or by one or more backend workflow subsystems 102 associated with the selected workflow tasks.

In such examples, the batch processing of multiple workflow tasks may be performed on heterogeneous workflow tasks associated with different backend workflow subsystems 102. For example, a group of selected workflow tasks may include workflow tasks associated with different backend workflow subsystems 102. A user may request that a particular workflow function (e.g., a function to approve or reject the tasks) be applied to the selected workflow tasks. Portal subsystem 106 may detect the request and respond by accessing and applying the request of the workflow function to each of the workflow tasks, subject to control by portal subsystem 106 or by the appropriate backend workflow subsystems 102, as described herein. Accordingly, by selecting multiple workflow tasks and providing a single request for a workflow function to be applied to the selected workflow tasks, a user may initiate application of a workflow function to multiple workflow tasks in mass.

Figure 8:
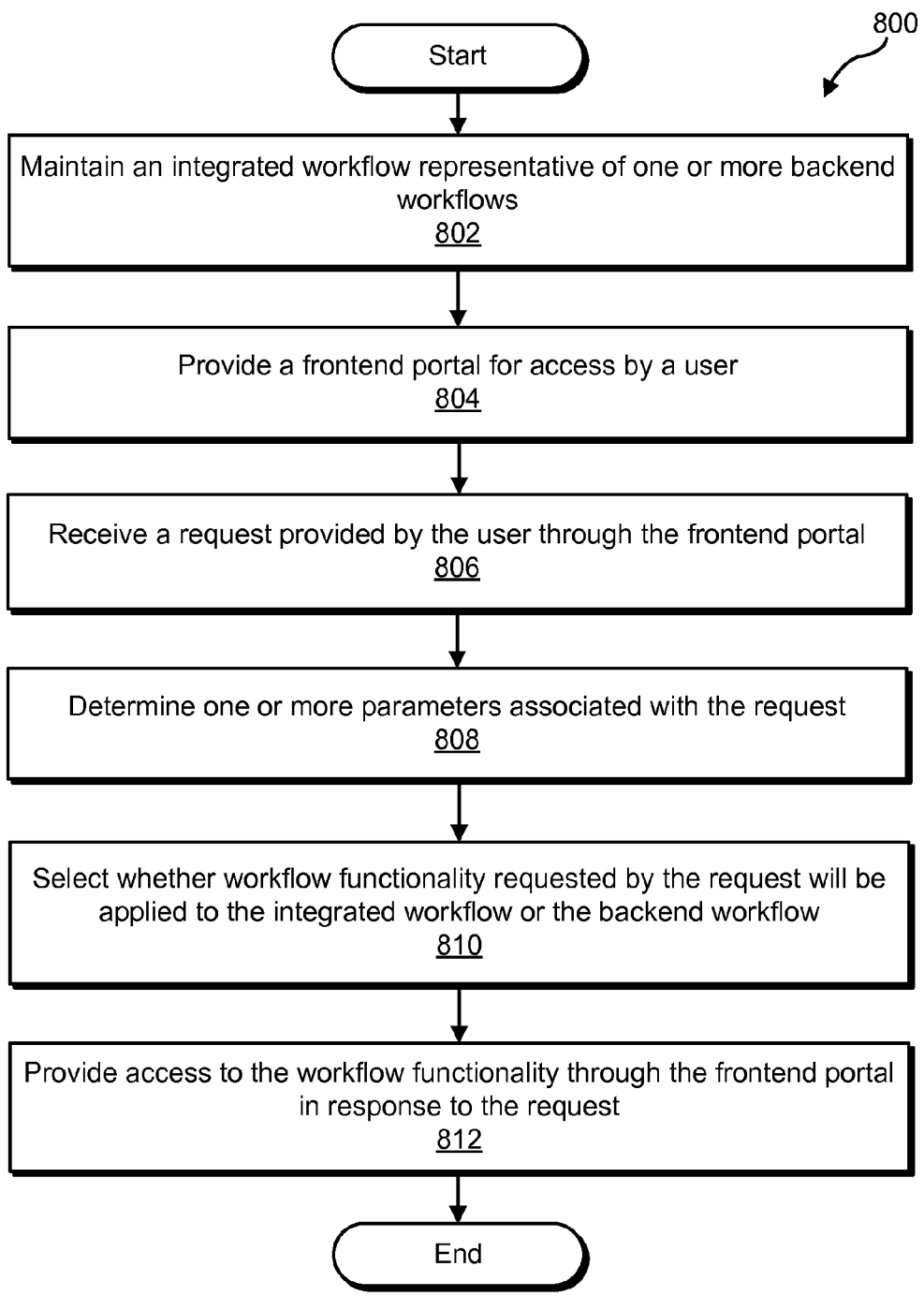
FIG. 8 illustrates an exemplary workflow integration and portal method according to principles described herein.

FIG. 8 illustrates an exemplary workflow integration and portal method 800. While FIG. 8 illustrates exemplary steps according to one embodiment, other embodiments may omit, add to, reorder, combine, and/or modify any of the steps shown in FIG. 8. In certain embodiments, one or more of the steps shown in FIG. 8 may be performed by one or more components of system 100.

In step 802, an integrated workflow representative of one or more backend workflows may be maintained. For example, integration subsystem 104 may maintain an integrated workflow including one or more sets of integrated workflow tasks and/or integrated workflow functions representative of one or more sets of backend workflow tasks and/or backend workflow functions maintained by one or more backend workflow subsystems 102.

In step 804, a frontend portal may be provided for access by a user. For example, portal subsystem 106 may provide frontend portal 108 for access by a user, as described above.

In step 806, a request provided by the user through the frontend portal may be received. For example, portal subsystem 106 may receive the user request through portal 108, as described above.

In step 808, one or more parameters associated with the request may be determined. For example, portal subsystem 106 may determine one or more parameters associated with the request. Such parameters may include any information specified in or otherwise related to the request, including, for example, a particular backend workflow or backend workflow subsystem 102 associated with the request and/or a particular workflow function requested by the request.

In step 810, a selection may be made as to whether workflow functionality requested by the request will be applied directly to the integrated workflow or the backend workflow. Application of the workflow functionality directly to the integrated workflow may be accomplished by applying the workflow functionality subject to the control of portal subsystem 106, as described above. Similarly, application of the workflow functionality directly to the backend workflow may be accomplished by applying the workflow functionality subject to the control by the backend workflow subsystem 102 maintaining the backend workflow. The selection may be made in any of the ways described herein.

In step 812, access to the workflow functionality may be provided through the frontend portal in response to the request. For example, portal subsystem 106 may provide access to the workflow functionality through frontend portal 108 in response to the request. As described herein, the workflow functionality to which access is provided through the frontend portal may be subject to control by portal subsystem 106 or a backend workflow subsystem 102. Accordingly, the workflow functionality to which access is provided through the frontend portal may be applied directly to the backend workflow or the integrated workflow.

In certain embodiments, one or more of the components and/or processes described herein may be implemented and/or performed by one or more appropriately configured computing devices. To this end, one or more of the systems and/or components described above may include or be implemented as one or more computing systems (e.g., a data integration computing subsystem 104) and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
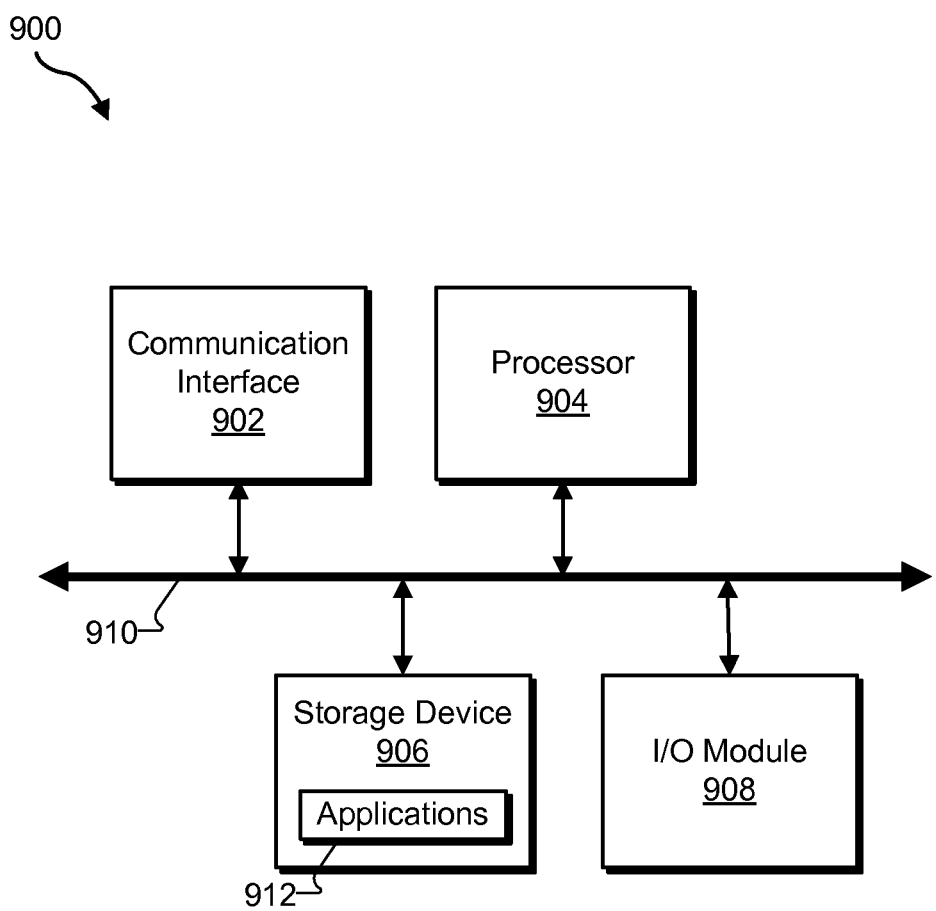
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more of provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the subsystems described herein may be implemented by or within one or more components of computing device 900. For example, one or more applications 912 residing within storage device 906 may be configured to direct processor 904 to perform one or more processes or functions associated with backend workflow subsystems 102, integration subsystem 104, portal subsystem 106, or any components thereof.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A system comprising:
   at least one physical computing device comprising:
   a workflow integration subsystem communicatively coupled to a backend workflow subsystem maintaining a set of backend workflow tasks native to the backend workflow subsystem, the workflow integration subsystem configured to maintain a set of integrated workflow tasks representative of the set of backend workflow tasks; and
   a portal subsystem configured to communicate with the workflow integration subsystem and the backend workflow subsystem, the portal subsystem further configured to
   provide a frontend portal for access by a user,
   receive a request provided by the user through the frontend portal, and
   provide access to workflow functionality through the frontend portal in response to the request;
   wherein the portal subsystem is further configured to select whether the workflow functionality to which access is provided through the frontend portal in response to the request is subject to control by the backend workflow subsystem or by the portal subsystem, the selection of whether the workflow functionality is subject to control by the backend workflow subsystem or by the portal subsystem based on a predefined set of work list rules that specify one or more conditions used to determine whether the workflow functionality is subject to control by the backend workflow subsystem or by the portal subsystem;
   wherein when the portal subsystem selects to provide the workflow functionality subject to control by the backend workflow subsystem, the portal subsystem provides a user interface for access by the user through the frontend portal, the user interface providing the user access to the workflow functionality subject to control by the backend workflow subsystem;
   wherein the portal subsystem provides the user interface for access by the user through the frontend portal by leveraging a backend user interface produced by the backend workflow subsystem; and
   wherein the portal subsystem leverages the backend user interface by utilizing a remote portlet technology to consume the backend user interface produced by the backend workflow subsystem.

2. The system of claim 1, wherein:
   the request is associated with the backend workflow subsystem and requests the workflow functionality; and
   the portal subsystem is configured to select whether the workflow functionality is subject to control by the backend workflow subsystem or by the portal subsystem based on at least one of the backend workflow subsystem associated with the request and the workflow functionality requested by the request.

3. The system of claim 2, wherein the requested workflow functionality comprises at least one of a request to access, approve, reject, and access additional details about a task.

4. The system of claim 1, wherein when the portal subsystem selects to provide the workflow functionality subject to control by the portal subsystem, the portal subsystem applies the workflow functionality directly to the set of integrated workflow tasks maintained by the workflow integration subsystem.

5. The system of claim 4, wherein:
   the application of the workflow functionality updates the set of integrated workflow tasks maintained by the workflow integration subsystem;
   the workflow integration subsystem is configured to notify the backend workflow subsystem of the update to the set of integrated workflow tasks; and
   the backend workflow subsystem is configured to respond to the notifying by the workflow integration subsystem by applying backend workflow functionality to update the set of backend workflow tasks to reflect the update to the set of integrated workflow tasks.

6. The system of claim 1, wherein when the portal subsystem selects to provide the workflow functionality subject to control by the backend workflow subsystem, the backend workflow subsystem applies the workflow functionality directly to the set of backend workflow tasks maintained by the backend workflow subsystem.

7. The system of claim 6, wherein:
   the applying of the workflow functionality updates the set of backend workflow tasks maintained by the backend workflow subsystem;
   the backend workflow subsystem is configured to notify the workflow integration subsystem of the update to the set of backend workflow tasks; and
   the workflow integration subsystem is configured to respond to the notifying by the backend workflow subsystem by applying integration workflow functionality to update the set of integrated workflow tasks to reflect the update to the set of backend workflow tasks.

8. The system of claim 1, wherein when the portal subsystem selects to provide the workflow functionality subject to control by the portal subsystem, the portal subsystem provides a user interface for access by the user through the frontend portal, the user interface providing the user access to the workflow functionality subject to control by the portal subsystem.

9. The system of claim 1, wherein the remote portlet technology comprises a Web Services for Remote Portlet ("WSRP") technology.

10. The system of claim 9, wherein:
the backend workflow subsystem includes a WSRP producer configured to produce a backend user interface portlet; and
the portal subsystem includes a WSRP consumer configured to consume the backend user interface portlet for inclusion in the user interface provided by the portal subsystem for access by the user through the frontend portal.

11. The system of claim 1, wherein the set of backend workflow tasks native to the backend workflow subsystem is integrated into the workflow integration subsystem as the set of integrated workflow tasks representative of the set of backend workflow tasks in accordance with one of a full-level integration, a summary-level integration, and a hybrid-level integration.

12. The system of claim 1, wherein one or more backend workflow functions of the backend workflow subsystem are integrated into the workflow integration subsystem as one or more integrated workflow functions configured to mirror the one or more backend workflow functions in accordance with one of a full-level integration, a summary-level integration, and a hybrid-level integration.

13. The system of claim 1, wherein:
the workflow integration subsystem is communicatively coupled to an additional backend workflow subsystem maintaining an additional set of backend workflow tasks native to the additional backend workflow subsystem, the workflow integration subsystem configured to maintain an additional set of integrated workflow tasks representative of the additional set of backend workflow tasks; and
the portal subsystem is configured to communicate with the additional backend workflow subsystem and to
receive an additional request provided by the user through the frontend portal, and
provide access to additional workflow functionality through the frontend portal in response to the additional request;
wherein the portal subsystem is further configured to select whether the additional workflow functionality to which access is provided through the frontend portal in response to the additional request is subject to control by the additional backend workflow subsystem or the portal subsystem.

14. The system of claim 13, wherein the backend workflow subsystem and the additional backend workflow subsystem are separate and heterogeneous.

15. The system of claim 13, wherein the set of backend workflow tasks native to the backend workflow subsystem and the additional set of backend workflow tasks native to the additional backend workflow subsystem are integrated into the workflow integration subsystem using different levels of integration.

16. The system of claim 13, wherein:
the set of backend workflow tasks native to the backend workflow subsystem is integrated into the workflow integration subsystem as the set of integrated workflow tasks representative of the set of backend workflow tasks in accordance with one of a full-level integration, a summary-level integration, and a hybrid-level integration; and
the additional set of backend workflow tasks native to the backend workflow subsystem is integrated into the workflow integration subsystem as the additional set of integrated workflow tasks representative of the additional set of backend workflow tasks in accordance with a different one of the full-level integration, the summary-level integration, and the hybrid-level integration.

17. The system of claim 1, wherein at least one of the one or more conditions used to determine whether the workflow functionality is subject to control by the backend workflow subsystem or by the portal subsystem includes one or more parameters associated with the request provided by the user.

18. A system comprising:
at least one physical computing device comprising:
a user interface facility configured to
provide a frontend portal for access by a user,
receive a request provided by the user through the frontend portal, and
provide access to workflow functionality through the frontend portal in response to the request; and
a work list facility configured to communicate with the user interface facility, a backend workflow subsystem maintaining a set of backend workflow tasks native to the backend workflow subsystem, and a workflow integration subsystem communicatively coupled to the backend workflow subsystem and maintaining a set of integrated workflow tasks representative of the set of backend workflow tasks;
wherein the work list facility is further configured to select whether the workflow functionality to which access is provided through the frontend portal in response to the request is subject to control by the backend workflow subsystem or the work list facility, the selection of whether the workflow functionality is subject to control by the backend workflow subsystem or by the work list facility based on a predefined set of work list rules that specify one or more conditions used to determine whether the workflow functionality is subject to control by the backend workflow subsystem or by the work list facility;
wherein when the work list facility selects to provide the workflow functionality subject to control by the backend workflow subsystem, the work list facility provides a user interface for access by the user through the frontend portal, the user interface providing the user access to the workflow functionality subject to control by the backend workflow subsystem;
wherein the work list facility provides the user interface for access by the user through the frontend portal by leveraging a backend user interface produced by the backend workflow subsystem; and
wherein the work list facility leverages the backend user interface by utilizing a remote portlet technology to consume the backend user interface produced by the backend workflow subsystem.

19. The system of claim 18, wherein:
the request is associated with the backend workflow subsystem;
the request requests the workflow functionality; and
the work list facility is further configured to select whether the workflow functionality is subject to control by the backend workflow subsystem or the work list facility based on at least one of the backend workflow subsystem associated with the request and the workflow functionality requested by the request.

20. The system of claim 18, wherein the work list facility utilizes the remote portlet technology to consume the backend user interface produced by the backend workflow subsystem by utilizing a Web Services for Remote Portlet ("WSRP") consumer to consume a backend user interface portlet produced by a WSRP producer at the backend workflow subsystem, and directing the user interface facility to provide the consumed backend user interface portlet in the user interface for access by the user through the frontend portal.

21. The system of claim 18, wherein the set of backend workflow tasks native to the backend workflow subsystem is integrated into the workflow integration subsystem as the set of integrated workflow tasks representative of the set of backend workflow tasks in accordance with one of a full-level integration, a summary-level integration, and a hybrid-level integration.

22. A method comprising:

maintaining, by a workflow integration and portal system, an integrated workflow representative of a backend workflow associated with a backend computing application;

providing, by the workflow integration and portal system, a frontend portal for access by a user;

receiving, by the workflow integration and portal system, a request provided by the user through the frontend portal;

determining, by the workflow integration and portal system, that the backend workflow is associated with the request;

determining, by the workflow integration and portal system, a workflow function requested by the request;

selecting, by the workflow integration and portal system, whether the workflow function will be applied directly to the integrated workflow or the backend workflow; and providing, by the workflow integration and portal system, access to the workflow function through the frontend portal in response to the request, wherein the workflow function to which access is provided through the frontend portal in response to the request is applied directly to the integrated workflow or the backend workflow based on a predefined set of work list rules that specify one or more conditions used to determine whether the workflow function is to be applied directly to the integrated workflow or the backend workflow;

wherein when the workflow integration and portal system selects to apply the workflow function directly to the backend workflow, the workflow integration and portal system provides a user interface for access by the user through the frontend portal, the user interface providing the user access to the workflow function subject to control by the backend computing application;

wherein the workflow integration and portal system provides the user interface for access by the user through the frontend portal by leveraging a backend user interface produced by the backend computing application; and wherein the workflow integration and portal system leverages the backend user interface by utilizing a remote portlet technology to consume the backend user interface produced by the backend computing application.

23. The method of claim 22, embodied as computer-executable instructions on at least one non-transitory computer-readable medium.

\* \* \* \* \*